US009439132B2

(12) United States Patent
Ammari et al.

(10) Patent No.: US 9,439,132 B2
(45) Date of Patent: Sep. 6, 2016

(54) METHOD FOR THE CONDITIONAL TRANSMISSION OF A CELLULAR FRAME OVER A NETWORK AND DEVICE FOR IMPLEMENTING THE SAME

(75) Inventors: Mohamed Ammari, Rueil Malmaison (FR); Djelal Raouf, Rueil Malmaison (FR); Michael Boutboul, Rueil Malmaison (FR); Charles Derivaux, Rueil Malmaison (FR)

(73) Assignee: SIERRA WIRELESS S.A., Issy-les-Moulineaux (FR)

( * ) Notice: Subject to any disclaimer, the term of this patent is extended or adjusted under 35 U.S.C. 154(b) by 64 days.

(21) Appl. No.: 13/821,557

(22) PCT Filed: Aug. 30, 2011

(86) PCT No.: PCT/EP2011/064890
§ 371 (c)(1),
(2), (4) Date: Mar. 7, 2013

(87) PCT Pub. No.: WO2012/031939
PCT Pub. Date: Mar. 15, 2012

(65) Prior Publication Data
US 2013/0165103 A1    Jun. 27, 2013

(30) Foreign Application Priority Data
Sep. 8, 2010  (FR) .................................. 10 57131

(51) Int. Cl.
*H04M 3/00* (2006.01)
*H04W 48/04* (2009.01)
*H04B 7/185* (2006.01)

(52) U.S. Cl.
CPC .......... *H04W 48/04* (2013.01); *H04B 7/18506* (2013.01)

(58) Field of Classification Search
CPC ..... H04W 48/16; H04W 8/24; H04W 48/04; H04M 1/6075; H04M 1/72577; H04M 1/72536; G01S 19/14
USPC .................... 455/434, 68, 524, 418
See application file for complete search history.

(56) References Cited

U.S. PATENT DOCUMENTS 5,850,179 A * 12/1998 Holmlund ............. H04W 24/00
                                                  340/309.16
6,771,960 B1 * 8/2004 Otting .................. H04W 48/16
                                                  455/434

(Continued)

FOREIGN PATENT DOCUMENTS

GB        2325592        11/1998
WO      WO 97/30561     8/1997

*Primary Examiner* — David Q Nguyen
(74) *Attorney, Agent, or Firm* — Blakely Sokoloff Taylor & Zafman LLP (57) ABSTRACT

The invention relates to a method for the conditional transmission of a cellular frame by a cellular device (10) over a cellular network (11) comprising cells (111). The invention is characterised in that it comprises steps in which: the device (10) scans (S2) the network (11) in order to detect cells (111); if at least one cell (111) is detected, the device (10) determines (S202) if at least one of the cells detected belongs to a list stored in a database (BDD) of the device (10) and listing the cells in which the transmission of a cellular frame is prohibited; and if none of the cells detected belongs to the list, the device (10) determines (S203) the value of a mobility variable (M) indicating whether or not the device is authorised to transmit, and the device (10) transmits (S204) a cellular frame when the mobility variable (M) indicates that the device is authorised to transmit. The invention also relates to a device for implementing said method.

10 Claims, 5 Drawing Sheets

(56) References Cited

U.S. PATENT DOCUMENTS

| | | | | |
|---|---|---|---|---|
| 8,160,577 B2* | 4/2012 | Bailin | ............ | H04W 48/04 |
| | | | | 455/410 |
| 8,886,185 B2* | 11/2014 | Lim | ............ | H04W 36/0083 |
| | | | | 455/434 |
| 9,237,598 B2* | 1/2016 | Kwon | ............ | H04W 84/18 |
| 2009/0117919 A1 | 5/2009 | Hershenson | | |
| 2009/0305699 A1* | 12/2009 | Deshpande | ............ | H04W 48/16 |
| | | | | 455/434 |
| 2010/0167714 A1* | 7/2010 | Howarter | ............ | H04W 8/24 |
| | | | | 455/418 |
| 2011/0076964 A1* | 3/2011 | Dottling | ............ | H04W 52/0232 |
| | | | | 455/68 |
| 2013/0065594 A1* | 3/2013 | Somasundaram | ... | H04J 11/0093 |
| | | | | 455/436 |

* cited by examiner

METHOD FOR THE CONDITIONAL TRANSMISSION OF A CELLULAR FRAME OVER A NETWORK AND DEVICE FOR IMPLEMENTING THE SAME

GENERAL TECHNICAL FIELD

The invention relates to a method of conditional transmission of a cellular frame by a cellular device over a cellular network comprising cells.

The invention also relates to a device for executing the method.

PRIOR ART

Communication standards over cellular networks (variously GSM/GPRS/EDGE/3G/4G for example) allow a cellular device to transmit and receive over a network.

Conventionally, transmissions and receptions are for example a transmission or a reception of
 voice or data communications,
 messages of type
 "camp", that is, a known registration operation of a cellular device on a network, or
 "location update", or location updating, that is, a known mechanism for a cellular device consisting of transmitting a cellular frame over the network to signal the position of the device over a cell frequency. This mechanism repeats while the device is registered over the network and can take place even if the device is not in motion in a cell to foil a variation in the quality of the radio link between the device and the cell over time.

However, in some geographic locations such as hospitals, and some airport zones, and particularly in an aircraft, it is requested that transmission from devices be restricted or cut.

The transmission restriction procedure of a cellular device is not automatic and requires an extinction command or order, or "aircraft mode" setting to be sent by a user of the device.

The user may forget to switch on the above procedure, which may cause transmission of a cellular frame by a device over the network in a prohibited transmission zone.

PRESENTATION OF THE INVENTION

The invention proposes eliminating at least one of these disadvantages.

For this purpose, according to the invention a method of conditional transmission of a cellular frame by a cellular device over a cellular network comprising cells is proposed, characterised in that it comprises steps according to which the device:
 scans the network to detect cells;
 if at least one cell is detected;
 the device determines if at least one of the cells detected belongs to a list, stored in a database of the device, listing the cells in which transmission of a cellular frame is prohibited;
 if none of the cells detected belongs to the list, the device determines the value of a mobility variable indicating whether or not the device is authorised to transmit,
 the device transmits a cellular frame when the mobility variable (M) indicates that the device is authorised to transmit.

The invention is advantageously completed by the following characteristics, taken individually or in any their technically possible combination:

if no cell is detected after the device scans the network, the device
 activates a time counter and
 is set for total transmission sleeping mode throughout the duration of the counter before taking a fresh scanning step of the network;
 if at least one cell is detected and at least one of the cells detected belongs to the list listing the cells in which the transmission of a cellular frame is prohibited, the device determines the value of the mobility variable;
 if the value of the mobility variable indicates that the device is authorised to transmit, the device saves a site identifier comprising at least one current cell and a current altitude of the device as initial starting values of the device;
 if the value of the mobility variable indicates that the device is not authorised to transmit, the device executes a step for finer determination of displacement, before the device activates a time counter and sets itself for total monitoring of transmission throughout the duration of the counter prior to executing a fresh scanning step of the network;
 the step for finer determination comprises
 a step according to which the device saves the data relative to the current cell in a memory of the device;
 a step according to which it determines whether the data relative to the current cells are the same as those stored as initial starting values,
 if the response is negative, then the device determines whether the device has remained at least twice the value of the time counter in the same cell, and if the response is positive,
 gives the false value for the value of the mobility variable;
 saves the data relative to the current cells as initial starting data of the device in a memory of the device.

The invention also relates to a device for executing the method.

The invention has numerous advantages.

The proposed invention makes the cellular device capable of automatically cutting any transmission as a function of prohibition criteria, by way of its onboard database listing prohibited cells. In particular, the device is prohibited from transmitting over the network given particular cases (presence in flying equipment, or in a place where any transmission is abolished partially or totally). The device does not know its geographic location and cannot transmit it: only the network can locate it from its various transmissions of cellular frames, by "location update". The device does not use a satellite navigation system, such as GNSS or GPS and is therefore less bulky.

The device has numerous applications.

It can be integrated into a cellular telephony terminal. The terminal prohibits itself from transmitting over the network given the abovementioned particular cases.

The device can also help trace any object in which it is integrated or on which it is carried, such as for example a package or any mail (for example postal), a vehicle or a cellular telephony terminal (for example stolen), or even a person.

PRESENTATION OF FIGURES

Other characteristics, aims and advantages of the invention will emerge from the following description which is purely illustrative and non-limiting and which must be considered in conjunction with the attached drawings, in which.

In the set of figures, similar elements bear identical reference numerals.

DETAILED DESCRIPTION

Figure 1A:
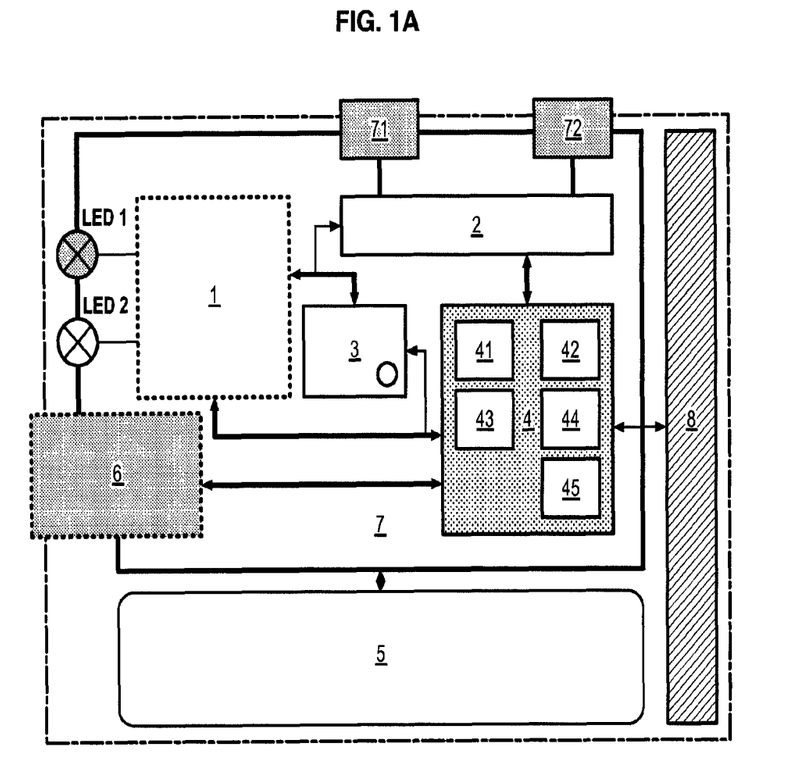
FIG. 1A schematically illustrates a device according to the invention.

FIGS. 2, 3, 4 and 5 schematically illustrate the principal steps of a method according to the invention, executed by a cellular device 10 illustrated in FIG. 1A.

Figure 1B:
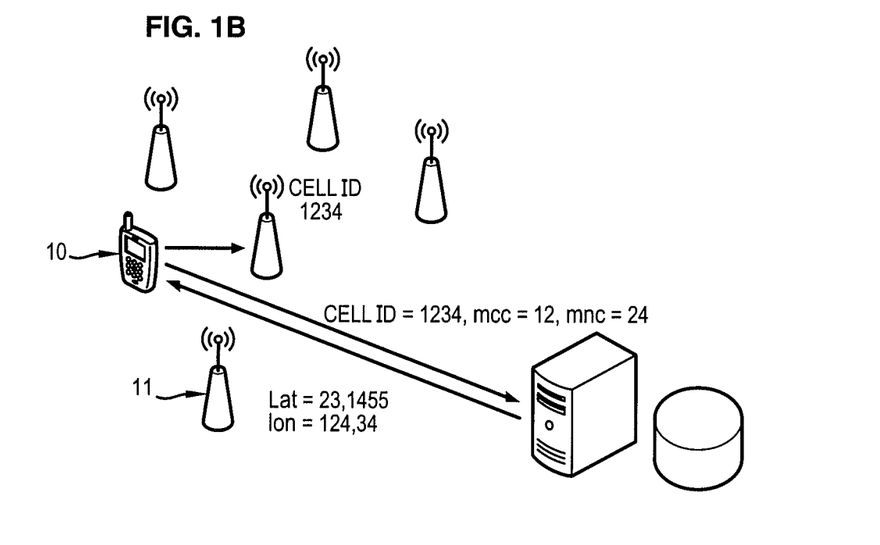
FIG. 1B schematically illustrates a system comprising a device according to the invention and a cellular network, FIGS. 2, 3, 4 and 5 schematically illustrate principal steps of a method according to the invention.

Cellular device means any device capable of transmitting or receiving cellular frames over a cellular network 11 illustrated in FIG. 1B.

The cellular frame can be a frame of the "location update" type, comprising for example a device serial number.

The network 11 is known to the expert and is not explained in further detail throughout the present description. It is specified only that it conventionally comprises cells 111, defined by base stations, and that it can for example be of GSM type (global System for mobile communications), 2G, GPRS, EDGE, 3G or 4G.

The device 10 mainly comprises a casing 7 comprising a push button 72 (for starting and stopping or resetting the device) connected to a module 4, in turn connected to a cellular antenna 8. The module 4 and the antenna 8 are placed in the casing 7.

The module 4 comprises a processor 43, a volatile memory 44, of RAM type for example, and a non-volatile memory 45, of EEPROM or Flash type for example, enabling especially the management of the transmission and the reception of cellular frames over the network 11, as well as storage of variables such as for example a mobility variable M, a counter, a time counter, cell identification, an altitude for example, as explained throughout the present description.

It is specified here that the device 10 also comprises advantageously a mobility detector 3, preferably for aircraft flight, for example.

The mobility detector 3 detects mobility, preferably flight in an aircraft, due to several criteria, as will be seen throughout the present description.

The detector 3 preferably detects a difference in pressure. The detector 3 can accordingly be a pressure sensor or a barometer, controlled by the processor 43.

The detector 3 can enable discrimination between several types of transport means, allowing mobility.

As said already, the usual and preferred case is that of an aircraft, since the device is not authorised to perform cellular transmissions in an aircraft. For this reason, the pressure surrounding the device at an apparent altitude, corresponding to the pressure inside a pressurised aircraft for example is selected as mobility detection criterion. It is also known that the value of the pressure is of atmosphere at sea level, and decrease with altitude, as is known. Measuring pressure therefore calculates altitude.

It is specified here that the device 10 also comprises:
a battery 5 enabling autonomy of electrical powering of the device,
a power-management unit 2,
means 1 for additional calculation of management, optional,
a SIM card slot 6 (Subscriber Identity Module) for example, optional, and
a USB port 71 (Universal Serial Bus).

The module 4 comprises a sub-module for signal processing 41 and a sub-module 42 for managing radio frequencies.

Figure 2:
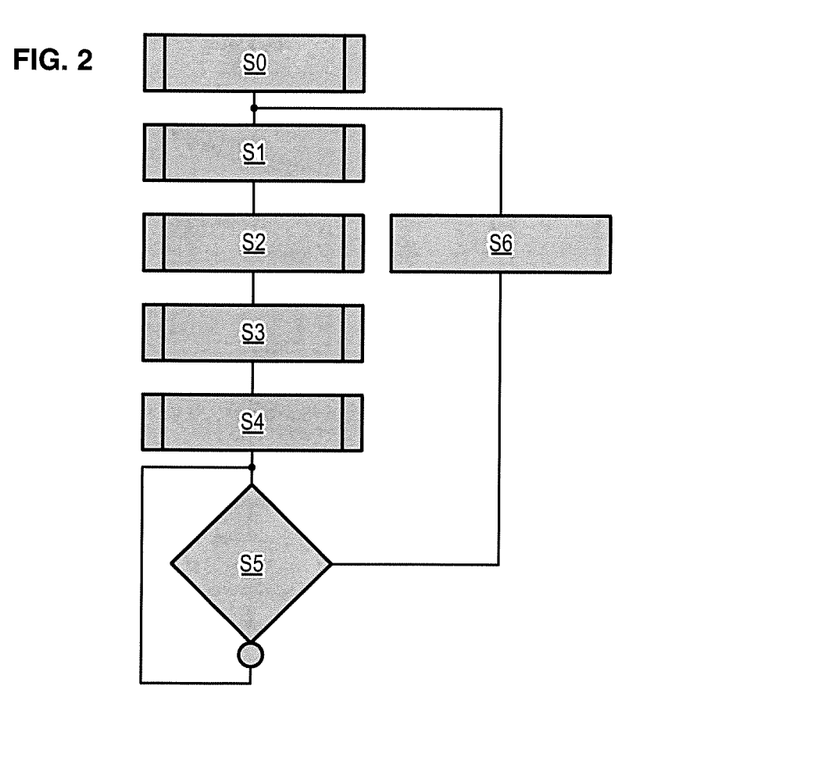

As FIG. 2 shows, a method of conditional transmission of a cellular frame by the cellular device 10 over the network 11 mainly comprises
an initialisation step S0 of the device 10,
a step S1 for determination of a value of a mobility variable M;
a step S2 for scanning of the network 11 to detect cells 111;
a step S3 for activation of a time counter T; and
a monitoring step S4 during which the device performs no scan or transmission over the network, throughout the time of the time counter, as shown in step S5,
a wake-up step S6 once the time T has elapsed during step S5, to return to step S1.

The above main steps will now be described in more detail, in reference to FIGS. 3 and 4 especially.

During step S0, the device 10 enters conditional transmission mode by actuation of the push button 72. The device 10 can also comprise light-emitting diodes LED1 and LED2 on the surface of the casing 7 to indicate the status of the push button 72 for example.

During step S0, the device 10 verifies conventionally the status of the module 4 and the different components of the device 10, as well as the status of the different variables stored in the memory 45 of the device. The variables stored in the memory 45 are:
a mobility variable M,
a counter value,
an initial mobility criterion, preferably the initial staring altitude of any displacement of the device,
an initial cell of the device, corresponding to the strongest radio link of the base stations, the initial cell being considered as the starting point of any displacement of the device, and
a time counter value T.

The variable M indicates especially whether the device is authorised to transmit or not, such as for example in an aircraft in flight. M can take two values, specifically the "true" value signifying that the device is not authorised to transmit, or the "false" value if the device is considered as being authorised to transmit.

If the memory 45 is empty (for example during initial startup or during resetting of the device), step S0 comprises an initialisation step of the variables, specifically
the mobility variable M is initialised at the "false" value,
the counter is reset to zero,
the initial mobility criterion is updated by means of the detector 3, for example the initial altitude Alt1 of the device is measured,
an initial cell of initial location, by way of the identification code (or "Cell ID") of the cell, known to the skilled person, for example ID1.

Figure 3:
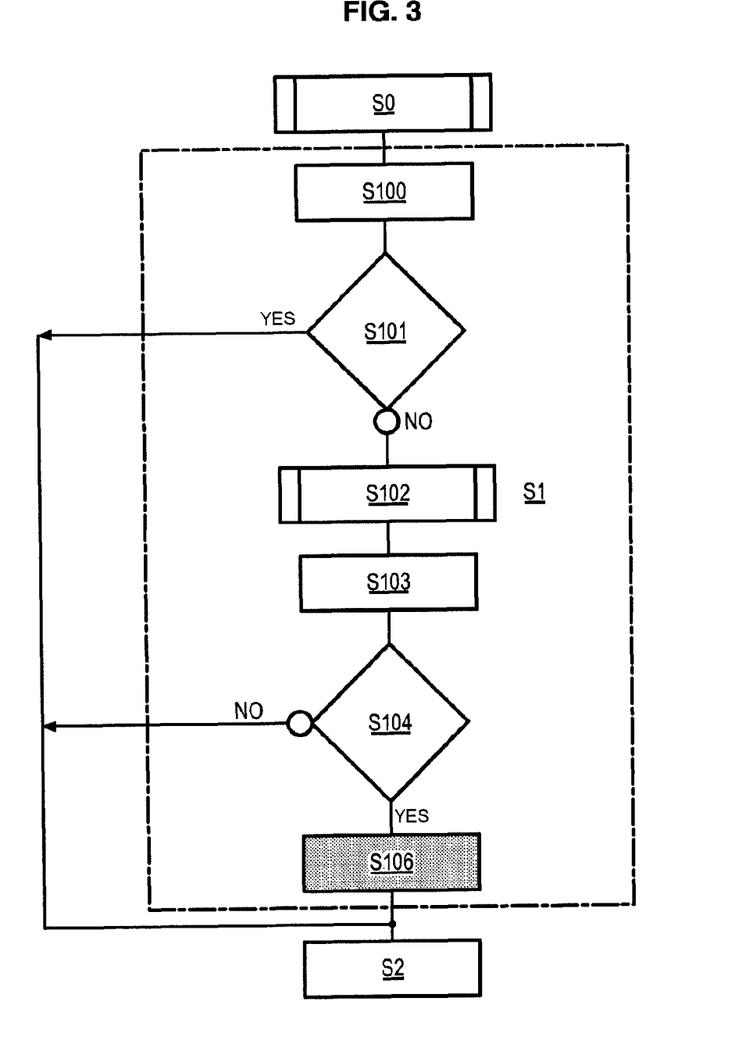

Step S1 comprises sub-steps illustrated in FIG. 3.

During a first sub-step S100, the device reads a current value of the mobility variable M. For this purpose, the processor 43 of the module 4 will read the current value of the variable M, stored in the memory 45. As said already, the value during initial execution of the method according to the invention is the false value, but the value can vary as explained hereinbelow.

During step S101, it determines whether M is at the true value, or the false value.

If the value is true, then step S2 is executed.

If the value is false, then a step S102 is executed.

During a step S102, the device 10 switches on the detector 3. As seen already, the detector can be an accelerometer, but preferably a pressure sensor.

During a step S103, the processor 43 commands the detector 3 to acquire at least one value representative of mobility. In our example, the sensor 3 acquires at least one pressure value so that the processor 43 can calculate at least one current altitude Alt2.

During a step S104, the processor 43 calculates a growth rate of altitude and compares it to a threshold Th, for example using the formula:

$$\frac{\Delta(Alt)}{\Delta t} \geq Th? \quad (E1)$$

It is understood that successive Alt measurements detect a very rapid relative increase in altitude. The inequation E1 measures the slope of the curve of increase in relative altitude and compares it to a threshold value Th.

This gives, for example

Δ(Alt)=Alt2−Alt1

Δt≈20 min

Th≈800 m.

If the inequation E1 is true, then the device is probably in an aircraft during a takeoff phase. Next comes a step S106, in which the true value for the variable M is written in the memory 45. Step S2 is then initiated.

If not, the increase in altitude is less than the threshold Th, and this indicates for example that the device is situated in transport means other than the aircraft, that takeoff has occurred fewer than 20 minutes ago, or that the device is subject to natural variation in atmospheric pressure, due to weather conditions, for example. The variable M retains the false value, and step S2 is then initiated.

In our example, the variable M is modified by the variation in altitude and therefore pressure measured by the detector 3.

But the variable M can be modified by mobility criteria other than pressure/altitude, such as for example:
 the acceleration variation the device undergoes, for example if the detector 3 can measure a gyroscopic and/or acceleration force, for example 3D, and/or
 the variation in speed, for example if the detector can measure the Doppler effect on the radio link, in low logic layer.

During step S2, the device 10, scans the network 11 to detect cells 111.

Figure 4:
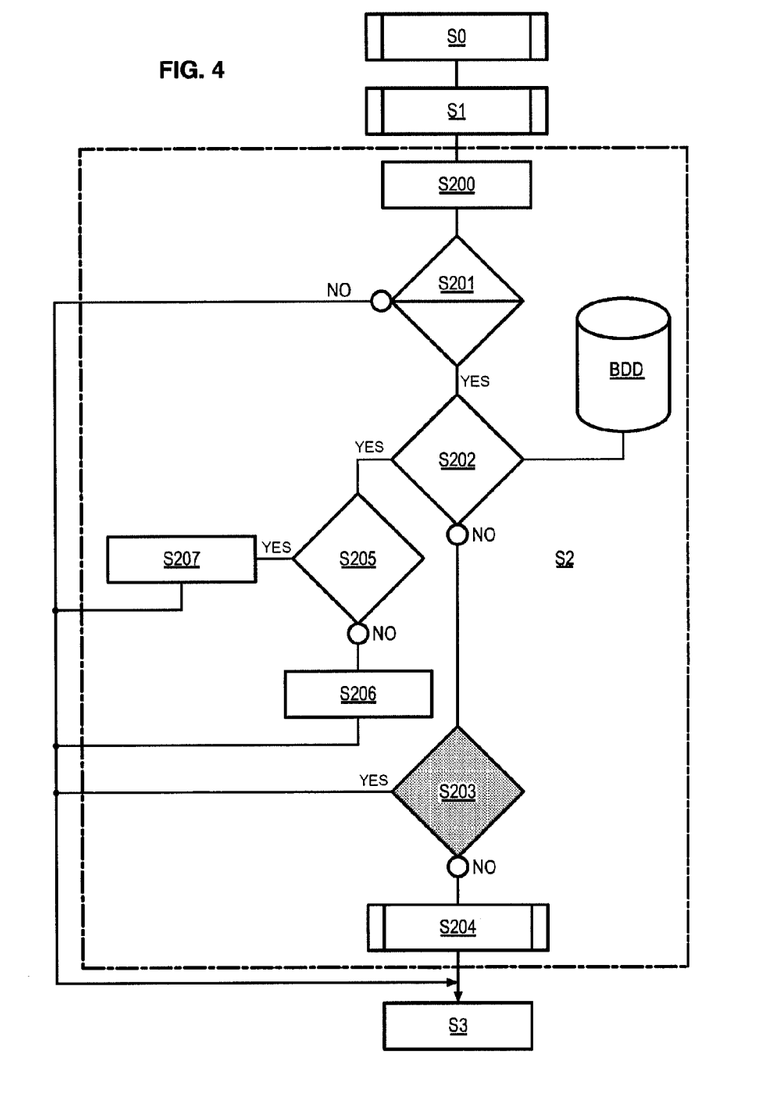

The step S2 comprises sub-steps illustrated in FIG. 4.

During step S200, the device executes a scan of the network 11, especially by way of the antenna 8.

Such a scan is known to the skilled person in cellular technology, and is not described in detail in the present description. The scan especially uses the RSSI criterion, specifically a digital value calculated by the device 10 and reflecting the quality of the radio link for reception and likely to accept an update for location, or "location update".

During a step S201, the device 10 determines whether at least one cell has been detected.

If no cell 111 is detected after the device scans the network 11, the device 10 then goes to step S3.

If at least one cell 111 is detected, the device sets up a register of the N best surrounding cells 111. For example N=7. The device executes a step S202.

During step S202, the device 10 compares the register of N cells 111 to a list in a database BDD stored in the memory 45. The list of the base BDD registers the cells 111 in which the transmission of a cellular frame is prohibited. Of course, the base BDD can be in compressed form to save space in the memory 45.

As shown in FIG. 1B, the list of the base BDD comprises, for each prohibited cell 111 of the list, an identification code (or "Cell ID"), known to the skilled person, as well as other parameters associated with these same cells 111, such as for example:
 the LAC ("local area code"), which is the code of the macro cell of a cellular network containing several cells 111, each having an identification code;
 the GPS coordinates;
 belonging to a given geographical location, such for example a hospital, an airport, or a military base.

On completion of comparison of S202, the device 10 is capable of deciding whether it is authorised to transmit or not over the network.

In fact, if at least one of the detected cells, and therefore of the register, belongs to the list of the base BDD, the device 10 then goes to a step S205, where the processor will read the value of the variable M.

If M has the value true, the device can be flying over an airport, and the device 10 then goes to a step S207.

If M has the false value, the device 10 is in an airport for example and is not authorised to transmit, and then goes to a step S206.

Figure 5:
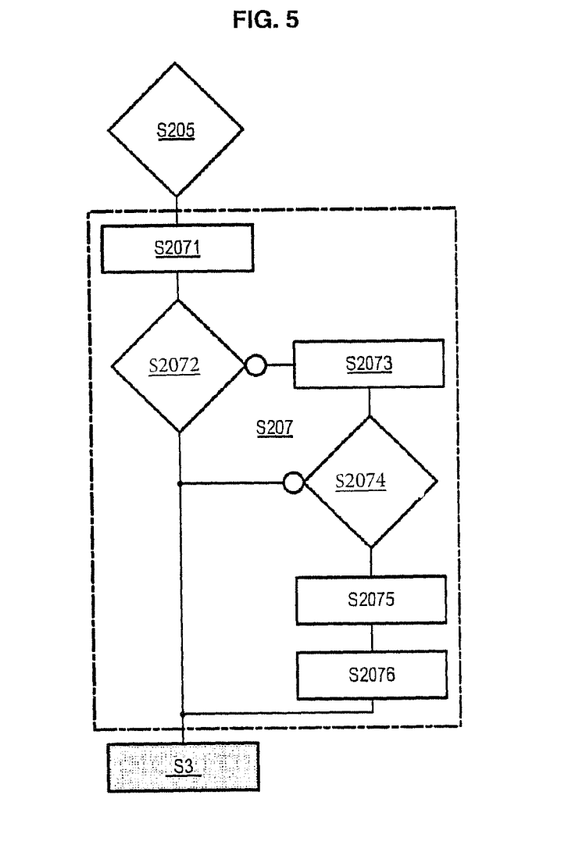

Step S207 is illustrated in FIG. 5 and comprises several sub-steps.

During a step S2071, the device records the data relative to the current cells, specifically at least the identification code ID2, in the memory 45.

The device then goes to a step S2072 where it determines whether the identification code ID2 of the current cell is the same as that stored as starting cell ID1.

If the response is positive, takeoff has just taken place, and the device goes to step S3.

If the response is negative, the device increases the counter initialised at step S0 during a step S2073.

During a step S2074, the device determines whether the counter has reached the value 2. Of course, a value other than 2 can be fixed for step S2074.

If the response is positive, during a step S2075 the device records the false value for the value M: the device is no longer in flight since it has remained more than twice T (or 40 min with our numerical application) in the same group of cells. This situation is in effect incompatible with the travelling speed of an aircraft.

Next, during a step S2076 the device indicates the current value of the altitude as Alt1 in the memory 45: the current altitude becomes the initial altitude since it is considered that the aircraft has landed. The device then goes to step S3.

If the response is negative during step S2074, this means that the device overflies a cell belonging to the list of the base BDD without landing there; the device goes to step S3.

If in reference to FIG. 4 the value of the variable M is false, this means that the device is in an airport and is readying for takeoff; the device now executes step S206.

During step S206 of FIG. 4, the device saves in memory 45 the current data relative to the cells (at least the identification code and the current altitude, corresponding to the name and altitude of the airport) as initial starting values for the aircraft. The device requires that the current values of the cell and altitude code become respectively ID1 and Alt1; then carries out step S3.

If on completion of step S202 none of the cells detected belongs to the list, the device 10 then goes to a step S203 where the processor will read the value of the variable M.

If M has the value true, the device is probably stolen, and the device 10 then goes to step S3.

If M has the false value, the device 10 can transmit and therefore goes to a step S204 for transmission of a location update over the network, before going to step S3.

As is known to the skilled person, because of step S204 the network can therefore obtain the position in the network of the device 10 due to the location update: the network can obtain the cell 111 (due to the LAC and/or the Cell ID) by which the device has executed the location update. The location update is a free operation over the network, not invoiced by the network operator, with a minimum of power consumption.

During step S3, the device activates a time counter T. The time T can be equal to 20 minutes for example, but it is parametrable as a function of the preferred frequency at the level of the location updates.

The device then goes to a step S4 in which the device is in total transmission monitoring, specifically it does not scan over the network, or transmit voice or data, or even a location update or any other signal transmitted to the network. The device can advantageously be set to monitor relative to the components to economise on self-powering.

The device continues to monitor throughout the counter time, as shown in step S5.

On completion of step S5, the time T has lapsed and the device executes a wakeup step S6 to return to step S1 described hereinabove.

The invention claimed is:

1. A method for conditional transmission of a cellular frame by a cellular device over a cellular network comprising cells comprising steps according to which the device:
   i) scans the network to detect cells;
   ii) if at least one cell is detected:
   the device determines whether at least one of the detected cells belongs to a list, stored in a database of the device, listing the cells in which emission of any cellular frame from the cellular device is prohibited;
   if none of the detected cells belongs to the list, the device determines the value of a mobility variable indicating whether or not the device is authorized to transmit, the device transmits a cellular frame when the mobility variable indicates that the device is authorized to transmit;
   if a least one of the detected cells belongs to the list, the device activates a time counter and sets itself for total transmission sleeping mode throughout the duration of the counter before executing steps i) and ii) again.

2. The method as claimed in claim 1, in which if no cell is detected after the device scans the network, the device
   activates a time counter and
   is set for a total transmission sleeping mode for the duration of the counter before performing a fresh scanning step of the network.

3. The method as claimed in claim 2, in which, if at least one cell is detected and at least one of the detected cells belongs to the list listing the cells in which transmission of a cellular frame is prohibited, the device determines the value of the mobility variable before the device activates the time counter and sets itself for total transmission sleeping mode throughout the duration of the counter before executing a fresh scanning step of the network.

4. The method as claimed in claim 3, in which if the value of the mobility variable indicates that the device is authorized to transmit, the device saves (S206)
   an identifier of a site comprising at least one current cell and
   a current altitude of the device as initial starting values of the device; if the value of the mobility variable indicates that the device is not authorized to transmit, the device executes a step for finer determination of displacement,
   before the device activates a time counter and sets itself for total transmission sleeping mode throughout the duration of the counter before executing a fresh scanning step of the network.

5. The method as claimed in claim 4, in which the step for finer determination comprises
   a step according to which the device saves the data relative to the current cells in a memory of the device;
   a step according to which it determines whether the data relative to the current cells are the same as those stored as initial starting values,
   if the response is negative, then the device determines whether the device has remained at least twice the value of the time counter in the same cell, and if the response is positive,
   gives the false value for the value of the mobility variable;
   saves the data relative to the current cells as initial starting data of the device in a memory of the device.

6. A device comprising a cellular antenna, a module and a mobility detector, the device being configured to:
   i) scan the network to detect cells;
   ii) if at least one cell is detected,
   determine whether at least one of the detected cells belongs to a list, stored in a database of the device,
   said list listing the cells in which emission of any cellular frame from the cellular device is prohibited;
   if none of the detected cells belongs to the list,
   determine the value of a mobility variable (M) indicating whether or not the device is authorized to transmit,
   the device being further configured to transmit a cellular frame when the mobility variable indicates that the device is authorized to transmit;
   if at least one of the detected cells belongs to the list, the device activates a time counter and sets itself for total transmission sleeping mode throughout the duration of the counter before executing steps i) and ii) again.

7. The device as claimed in claim 6, in which, if no cell is detected after the device scans the network, the device is configured to
   activate a time counter and
   set itself for a total transmission sleeping mode for the duration of the counter before performing a fresh scanning step of the network.

8. The device as claimed in claim 7, in which, if at least one cell is detected and at least one of the detected cells belongs to the list listing the cells in which transmission of a cellular frame is prohibited, the device is configured to determine the value of the mobility variable.

9. The device as claimed in claim 8, in which:
   if the value of the mobility variable indicates that the device is authorized to transmit, the device is configured to save an identifier of a site comprising at least one current cell, and a current altitude of the device as initial starting values of the device;

if the value of the mobility variable indicates that the device is not authorized to transmit, the device is configured to execute a step for finer determination of displacement, before the device activates a time counter and sets itself for total transmission sleeping mode throughout the duration of the counter before executing a fresh scanning step of the network.

10. The device as claimed in claim 9, in which the device is configured to perform a step for finer determination which comprises a step according to which the device saves the data relative to the current cells in a memory of the device;

a step according to which it determines whether the data relative to the current cells are the same as those stored as initial starting values, if the response is negative, then the device is configured to determine whether the device has remained at least twice the value of the time counter in the same cell, and if the response is positive, the device is configured to give the false value for the value of the mobility variable and to save the data relative to the current cells as initial starting data of the device in a memory of the device.

\* \* \* \* \*

UNITED STATES PATENT AND TRADEMARK OFFICE
CERTIFICATE OF CORRECTION

| | | |
|---|---|---|
| PATENT NO. | : 9,439,132 B2 | Page 1 of 1 |
| APPLICATION NO. | : 13/821557 | |
| DATED | : September 6, 2016 | |
| INVENTOR(S) | : Ammari et al. | |

It is certified that error appears in the above-identified patent and that said Letters Patent is hereby corrected as shown below:

In the Claims

Column 7, Claim 1, Line 51, delete "transmit," insert -- transmit, and --

Column 7, Claim 1, Line 55, delete "a" insert -- at --

Signed and Sealed this
Twenty-fourth Day of January, 2017

Michelle K. Lee
*Director of the United States Patent and Trademark Office*